UNITED STATES PATENT OFFICE.

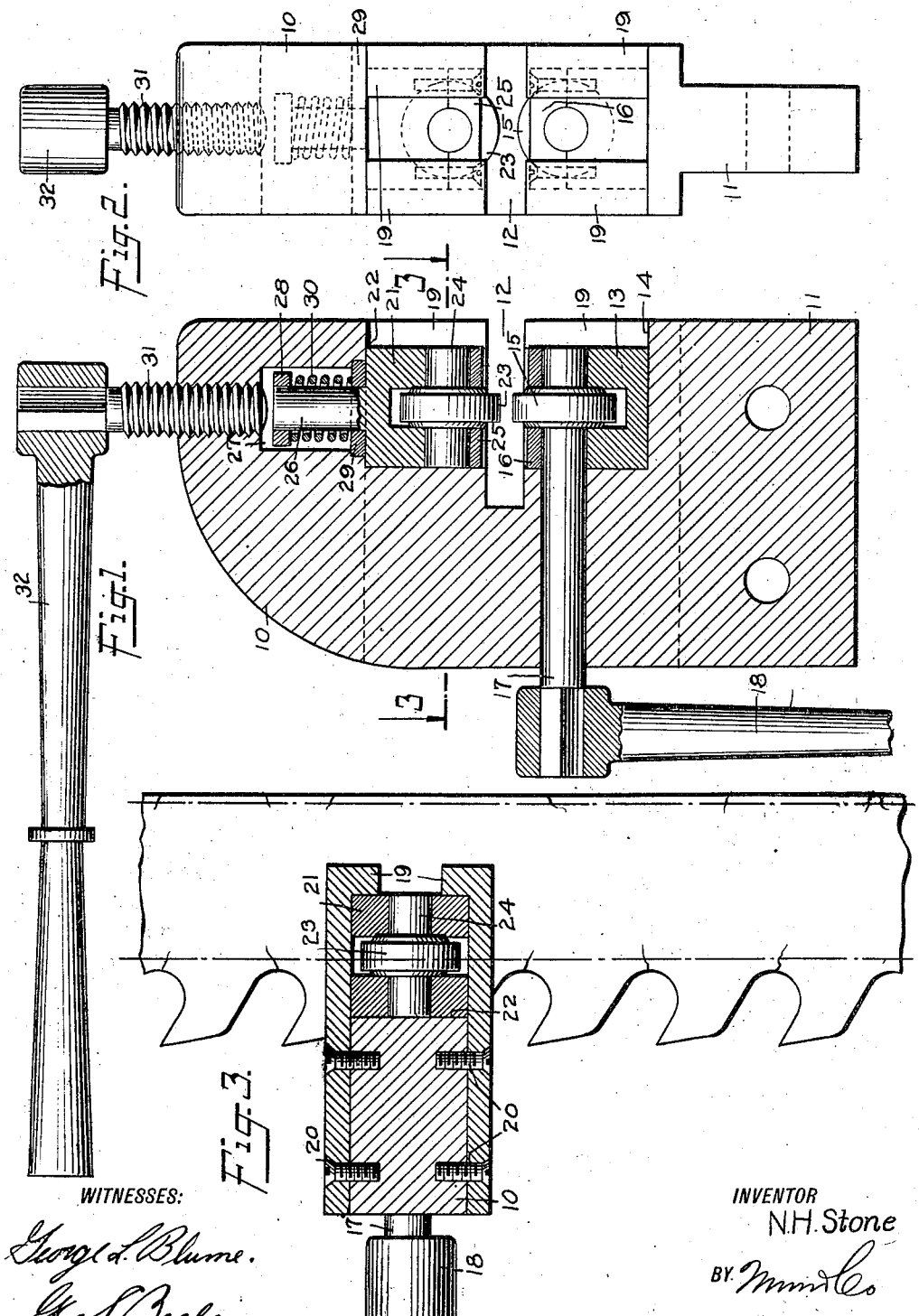

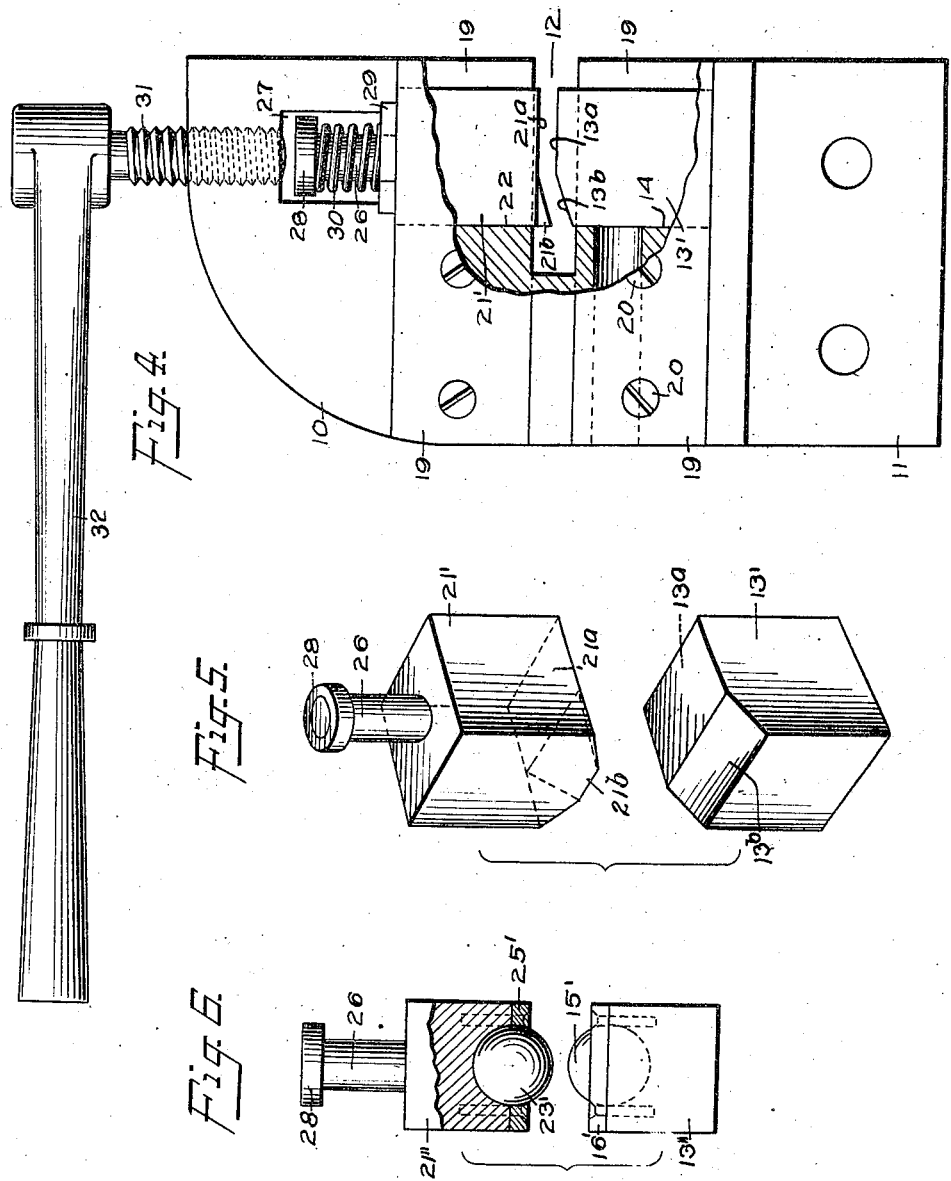

NORMAN HENRY STONE, OF GARYVILLE, LOUISIANA.

SAW-RIM ADJUSTER.

1,155,966.   Specification of Letters Patent.   Patented Oct. 5, 1915.

Application filed May 4, 1915. Serial No. 25,723.

*To all whom it may concern:*

Be it known that I, NORMAN H. STONE, a citizen of the United States, and a resident of Garyville, in the parish of St. John the Baptist and State of Louisiana, have invented a new and Improved Saw-Rim Adjuster, of which the following is a full, clear, and exact description.

This invention relates to saw mill appliances and has particular reference to means for treating band or circular saws to prevent damage thereto such as buckling or cracking along their backs or along the throats of their teeth.

Among the objects of the invention, therefore, is to provide an improved device for operation upon saws for the purposes above set forth, and also under certain conditions to be employed as means for setting the teeth of a saw, either separately or in conjunction with the saw straightening means.

The foregoing and other objects of the invention will hereinafter be more fully described and claimed and illustrated in the drawings forming a part of this specification in which like characters of reference indicate corresponding parts in all the views, and in which—

Figure 1 is a vertical sectional view of one embodiment of the invention, showing the use thereof with traction rollers to stretch or expand the saw; Fig. 2 is a rear elevation of the same; Fig. 3 is a transverse sectional view on the line 3—3 of Fig. 1, showing the relation of a well known form of band saw thereto; Fig. 4 is a side elevation of the same apparatus but with a modified form of jaws applied for use upon the saw; Fig. 5 indicates in perspective the form of jaws shown in Fig. 4; and Fig. 6 is another modification of jaws adapted to be used as guides for a saw while being operated by other means.

The several parts of this device may be made of any suitable materials, and the relative sizes and proportions of the same, as well as the general design of the mechanism, may be varied to a considerable extent without departing from the spirit of the invention hereinafter more fully described and claimed.

In all forms of the invention I prefer to use a head or bracket 10 having a shank 11 as an indication for any suitable means for securing the same to a bench or saw grinder in a rigid stationary position. The bracket 10 has a slot or mouth 12 extending into its rear edge for the passage of the saw blade, and adjacent or on opposite sides of said mouth or slot 12 are blocks or jaws having parts or surfaces acting upon the opposite faces of the saw blade while the same is being moved therethrough. As indicated in Figs. 1 to 3, the jaw 13 is seated in a stationary position in a cavity 14, and a roller 15 is journaled in said block, being held in place by means of the cap 16. The shaft 17 of this roller may extend beyond the front edge of the bracket for the attachment of a handle or crank 18 whereby said roller 15 may be rotated in its bearing block. This block is locked in position on the bracket and from displacement from the socket 14 by a pair of face plates 19 of angular formation secured upon opposite faces of the bracket by means of screws 20 or their equivalent.

Opposite the slot 12 from the traction roller 15 is a block 21 seated in a socket 22 and held from displacement therefrom by a pair of face plates 19 as described above in connection with the block 13. A roller 23 is journaled on an axle 24 in the block 21 and held in place by means of a cap 25. The block 21 has a shank 26 extending therefrom in a direction opposite from the roller 15 into a recess 27 and carries at its outer end a collar 28 between which and the fixed plate 29 is a coil spring 30, the normal tendency of which is to hold the roller 23 spaced as far as possible from the roller 15 to facilitate the introduction of the saw to the slot or its removal therefrom. The plate 29 extends transversely of the bracket 10 and is supported upon the upper edges of the adjacent plates 19. It will be understood that the rollers 15 and 23 are arranged substantially in the same plane and opposite each other whereby their adjacent contact points are adapted to bear on directly opposite points of the saw blade.

Pressure may be applied to the movable block 21 by any suitable means such as shown in Figs. 1 and 2, such means comprising a power screw 31 tapped into the outer or upper end of the bracket 10 in axial alinement with the shank 26. A crank or handle 32 is secured to said screw whereby, upon manipulating the handle the screw will bear forcibly upon the end of the shank, forcing it inwardly against the tension of the spring 30 and causing the roller 23 to bear upon the saw opposite the roller 15 with sufficient force to stretch or expand the metal. With the saw applied as shown and described above, it may be fed longitudinally through the slot between the rollers either by the usual driving means for the saw or by force applied to the crank 18, causing the roller 15 to act as a traction roller and cause the movement of the saw.

In Figs. 4 and 5 I show an application of the same mechanism in which the jaws 13' and 21' coöperate with the bracket on opposite sides of the slot 12 as before described. Said blocks, however, in this form of the invention are not provided with rollers but are formed with oppositely arranged plane faces 13ª and 21ª respectively, which, acting upon opposite faces of the saw adjacent the throats of the teeth, will expand the same as desired. One of the blocks, however, is beveled away as indicated at 13ᵇ, while the other is provided with a projection 21ᵇ serving to act upon a saw tooth and set the same coincidentally with the action of the flat faces as described. As in the previous modification, the movable block has a shank 26 and a collar 28 for the accommodation of the spring 30. The saw in this form of the device will be operated step by step along the space or slot 12 and the hand operated screw 31 will be applied as above described to apply the required pressure to the movable block.

In Fig. 6 the fixed and movable blocks 13'' and 21'' are provided with rollers in the form of balls 15' and 23' respectively, held in place by caps 16' and 25', but as already described they are arranged with their active points directly opposite each other for guiding and truing action upon opposite sides of the saw blades passing between them. It will be understood that these blocks with their rollers are adapted to operate in the sockets 14 and 22, substantially as already set forth.

I claim:—

1. In a device of the character set forth, the combination of a bracket having a transverse slot formed therein and a pair of sockets on opposite sides of the slot, a pair of blocks in said sockets, a pair of L-shaped plates secured to the bracket and embracing each of said blocks preventing displacement thereof from the bracket, one of said blocks being rigidly held and the other being movable toward or from the stationary block, and saw shaping means carried by the blocks, substantially as set forth.

2. In a device of the character set forth, the combination of a rigid bracket having a transverse slot therein and a pair of sockets on opposite sides of the slot, a fixed jaw rigidly secured in one of said sockets, a movable jaw slidable in the other socket and having a shank secured thereto extending therefrom in a direction opposite from the fixed block, a collar carried by the end of the shank, a coil spring surrounding the shank and bearing at one end against the collar, face plates preventing lateral displacement of the blocks, a plate extending across the bracket in stationary position and supporting the inner end of said spring, the supporting plate resting upon said face plates, and means acting through the end of the bracket and against the end of the shank to cause the movable jaw to advance forcibly toward the fixed jaw against the tension of the coil spring.

NORMAN HENRY STONE.

Witnesses:
PERRY E. BRANNINGER,
GEO. D. TRICHE.

Copies of this patent may be obtained for five cents each, by addressing the "Commissioner of Patents, Washington, D. C."